(12) United States Patent
Loverich et al.

(10) Patent No.: US 10,908,048 B2
(45) Date of Patent: Feb. 2, 2021

(54) MACHINE HEALTH MONITORING SYSTEM AND METHOD

(71) Applicant: KCF TECHNOLOGIES, INC., State College, PA (US)

(72) Inventors: Jacob J. Loverich, State College, PA (US); Jeremy E. Frank, Pine Grove Mills, PA (US); David R. Kraige, State College, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 590 days.

(21) Appl. No.: 15/156,311

(22) Filed: May 16, 2016

(65) Prior Publication Data

US 2016/0370259 A1    Dec. 22, 2016

Related U.S. Application Data

(60) Provisional application No. 62/161,711, filed on May 14, 2015.

(51) Int. Cl.
| | | |
|---|---|---|
| *G06F 19/00* | (2018.01) | |
| *G01M 13/00* | (2019.01) | |
| *G01M 99/00* | (2011.01) | |
| *G01N 29/14* | (2006.01) | |
| *G01N 29/24* | (2006.01) | |
| *G01N 29/44* | (2006.01) | |
| *G05B 23/02* | (2006.01) | |

(52) U.S. Cl.
CPC .......... *G01M 13/00* (2013.01); *G01M 99/008* (2013.01); *G01N 29/14* (2013.01); *G01N 29/2481* (2013.01); *G01N 29/4472* (2013.01); *G01N 2291/0258* (2013.01); *G05B 23/0283* (2013.01)

(58) Field of Classification Search
CPC .. G01N 2291/0258; B64F 5/0045; B64F 5/60
USPC .......................... 702/183, 182, 184, 185, 188
See application file for complete search history.

(56) References Cited

U.S. PATENT DOCUMENTS

| | | | |
|---|---|---|---|
| 5,895,857 A | 4/1999 | Robinson et al. | |
| H002057 H * | 1/2003 | Veers | ............................. 416/230 |
| 7,493,220 B2 | 2/2009 | Leigh et al. | |
| 8,656,779 B2 * | 2/2014 | Adams | ................ G01M 5/0033 73/579 |
| 2005/0072234 A1 * | 4/2005 | Zhu | .......................... G01H 1/00 73/579 |
| 2007/0229248 A1 * | 10/2007 | Mott | ........................ G01H 1/16 340/522 |
| 2008/0234983 A1 | 9/2008 | Leigh et al. | |
| 2013/0268154 A1 * | 10/2013 | Kreitmair-Steck | ... B64F 5/0045 701/29.1 |

(Continued)

*Primary Examiner* — Michael J Dalbo
(74) *Attorney, Agent, or Firm* — MH2 Technology Law Group LLP

(57) ABSTRACT

A machine health monitoring method may include receiving vibration data indicating vibration of a machine or a component of the machine, determining damage to the machine or the component for each of a plurality of load cycles based on the vibration data, determining the time rate of change of the damage to the machine or the component over the plurality of load cycles, and determining a damage rate based on the time rate of change of the damage to the machine or the component relative to a baseline damage rate.

21 Claims, 6 Drawing Sheets

(56) References Cited

U.S. PATENT DOCUMENTS

2013/0270827 A1* 10/2013 Couchman .............. F03D 7/028
  290/44
2013/0275059 A1* 10/2013 Bernhard ........... G05B 23/0221
  702/42

* cited by examiner

MACHINE HEALTH MONITORING SYSTEM AND METHOD

CROSS-REFERENCE TO RELATED APPLICATION

This application claims the benefit of priority of U.S. Provisional Patent Application No. 62/161,711 filed on May 14, 2015, which is incorporated herein in its entirety.

BACKGROUND

Optimizing maintenance practices is essential to maximizing profitability in industrial markets. Maintenance affects profitability by influencing downtime, failure-related collateral damage, energy efficiency, component life and most importantly, safety of employees.

Traditional approaches to optimizing maintenance focuses on planning part replacement times based on historical distributions of failure times and expected part lives. In most industries, the distribution of failure times and types is wide due to a range of difficult to control variables in an industrial environment, including the quality and precision of the routine maintenance. This leads to overly conservative maintenance and unexpected failures.

Condition Base Maintenance (CBM) reduces overly conservative maintenance by measuring the health of a component or machine and then tailoring maintenance to fit the specific needs at a particular point in time, thus accommodating variation in usage conditions and operational load. In practice, CBM is enabled by using 1) periodic route-based inspections including vibration monitoring, or 2) instrumenting of equipment with wired sensors and continuously monitoring operation parameters and vibration. Route monitoring is typically performed with hand-held devices and performed on a monthly basis. A typical facility may have hundreds of monitoring points.

In a typical application scenario, the onset and progression of faults such as unbalance and bearing wear are tracked. When fault indicators approach critical thresholds, specific maintenance is scheduled to prevent failure events and the resulting unscheduled maintenance. With this approach, the correct parts can be ordered in advance and are on hand to perform scheduled maintenance.

When applied to a typical pump, CBM offers $900 of savings per 100 hp annually relative to reactive maintenance costs. The US Department of Energy estimates that 55% of maintenance is performed using high cost reactive approaches. Thus, it is evident that there are great opportunities to improve profitability by moving to a more enlightened approach to maintenance in general.

Route-based monitoring in part addresses the need for broad application of condition monitoring, but it lacks capability to catch many failures for the following reasons: 1) route-monitoring is done under controlled conditions (generally fixed load and running speed) so that the data can accurately be compared to a bench mark taken in a similar operating scenario, 2) it is performed on an infrequent basis due to the cost of manually acquiring data, and 3) hard to reach locations are rarely monitored or not at all.

The vast majority of machine failures, 89% reported in one study, are unexpected and only 11% are related to traditional machine wear out. These unexpected failures occur due to improper installation, maintenance, environmental conditions, or operating loads and speeds. In practice, such conditions can change rapidly and do not follow traditional, Potential Failure—Failure commonly known as P-F curves. Severe damage may be intermittent and go unnoticed for months or years. For example, cavitation in a pumping system is often intermittent and nearly always overlooked by conventional, diagnostic, route-based (periodic inspections) monitoring.

Similarly, machine resonance during spin-up and spin-down is not recognized by conventional diagnostics even though significant damage can occur during these transient operating conditions. Excessive loading and most faults in reciprocating equipment are intermittent and rarely considered by most diagnostic methods. This is because the root cause of damage in many cases is not directly related to a particular fault, and, therefore, the conditions that cause the damage in the first place often do not match a fault indicator anyway. In such cases, fault conditions are treated as outliers or are filtered out by fault indicator data analysis. Using route-monitoring, these conditions generally aren't observed at all. Only in certain cases do coincidentally timed inspections identify such conditions and enable them to be addressed with conventional diagnostics.

Wired sensor (permanently installed) condition monitoring technology has proven to be highly valuable for enabling CBM in highly critical applications such as power generation turbines. However, Balance of Plant (BoP) assets such as pumps and motors have not benefited from online monitoring owing to the high capital cost—and in particular the high installation cost—of wired monitoring systems. The benefits of continuous monitoring have been well established, but the cost has only been justifiable for rare cases of high capital cost equipment.

The data acquisition is only one challenge with applying CBM methodologies. In most cases, advanced diagnostics and prognostics are also problematic to apply practically in the BoP because they require some combination of large historical fault data sets and detailed machine failure analysis. In addition, both the training data and the fault analysis are specific to a given application. For example, pumps in certain paper manufacturing facilities fail due to circumstances such as overheating and starvation, while the same pump in a lube oil system in an aluminum rolling facility may fail due to bearing wear or water contamination of the lube oil. These requirements and practical considerations make such detailed implementations too expensive to justify application to the BoP. At present, the current state of the art in prognostics is only practical for high capital cost equipment such as helicopters, turbines, etc.

In fact, the research in this area has little hope for addressing the broader need for wide scale, automated, and broadly applicable diagnostics and prognostics because funding for such development is focused almost exclusively on high value assets, despite the fact that the BoP market dwarfs the rest of the industrial machinery market. As a point of reference, 10% of global electrical energy production is consumed by pumps, which are only one part of the BoP.

With recent advancements in low power electronics, M2M communication, and cloud resources, it is now possible to cost-effectively monitor the health of BoP assets continuously. The BoP refers to equipment supporting primary assets such as turbines in power plants. BoP equipment includes fans, pumps, and motors which are found in most industrial facilities, chemical plants, and manufacturing plants. The health of these less critical assets is typically not monitored, or is monitored with infrequent, periodic route-based techniques. Continuous machine health monitoring has the potential to offer dramatic improvements over traditional reliability programs by virtue of the much larger amount of machine health evidence, near real-time results, and analysis across a range of operating conditions. It may be desirable to provide a machine health monitoring system that derives practical value from continuous monitoring, despite the limited knowledge of operators and maintainers in the BoP, small budgets for setup and customization of data analysis, and the large volume of data that must be analyzed.

SUMMARY

The machine health monitoring system of the present disclosure (also known as Damage Accumulation indicator) addresses the aforementioned challenges by reducing the upfront installation and setup cost, simplifying analysis, and supporting existing route-based monitoring programs. Using the Damage Accumulation indicator in combination with continuous monitoring enables the requirement for absolute precision in machine health monitoring and forecasting to be relaxed and is justifiable for the BoP because asset cost is relatively low and scheduled downtime is frequent. In this paradigm, practical cost savings are derived mainly from moving unscheduled maintenance into scheduled time slots. This requires failure prediction with a time resolution that is shorter than the scheduled downtime interval. High probability fault identification on such time scales is achievable using the proposed Damage Accumulation analysis technique. This is in contrast to the higher precision needed to derive value from route monitoring where the inspection interval is typically much longer than the downtime interval. In route monitoring, the machine health evidence is only a brief snapshot versus the thorough evidence provided by continuous monitoring.

Additional value is derived from the proposed methods, based on the new ability to provide easy to understand and actionable machine health status in near real time to operators to avoid problematic conditions. Avoiding these conditions in industrial facilities is typically not well served by detailed diagnostic or prognostic tools and analysis since most of these conditions occur unexpectedly, are temporary, and are difficult to model. Damage Accumulation indicator offers the ability to not only identify traditional rotating machinery faults, but also identify adverse operation conditions that damage machines, leading to reduced component life and unexpected failures According to various aspects of the disclosure, a machine health monitoring method may include receiving vibration data indicating vibration of a machine or a component of the machine, determining damage to the machine or the component for each of a plurality of load cycles based on the vibration data, determining the time rate of change of the damage to the machine or the component over the plurality of load cycles, and determining a damage rate based on the time rate of change of the damage to the machine or the component relative to a baseline damage rate.

In some embodiments of the method, the step of determining the damage for each of the plurality of load cycles may include determining the damage for each of the plurality of load cycles at a critical failure-prone location as proportional to a load on the machine or the component raised to a material-dependent exponent.

In some embodiments of the method, the step of determining the damage for each of the plurality of load cycles may include relating a load on the machine or the component to one or more measurements from the vibration data using a transfer function. The transfer function may be frequency dependent. The load may be proportional to acceleration, velocity, or displacement.

In some aspects of the method, the machine health monitoring method may further include acquiring the one or more vibration measurements using wireless vibration accelerometers. In some embodiments of the method, the step of determining the damage rate may include determining one or more damage rates from one or more sensors at the machine or the component.

According to various aspects of the disclosure, a machine health monitoring apparatus may include a processor configured to receive vibration data indicating vibration of a machine or a component of the machine. The processor may be further configured to determine damage to the machine or the component for each of a plurality of load cycles based on the vibration data, determine the time rate of change of the damage to the machine or the component over the plurality of load cycles, and determine a damage rate based on the time rate of change of the damage to the machine or the component relative to a baseline damage rate.

In some embodiments of the apparatus, the processor may be configured to determine the damage for each of the plurality of load cycles at a critical failure-prone location as proportional to a load on the machine or the component raised to a material-dependent exponent.

In some embodiments of the apparatus, the processor may be configured to determine the damage for each of the plurality of load cycles by relating a load on the machine or the component to one or more measurements from the vibration data using a transfer function. The transfer function may be frequency dependent. The load may be proportional to acceleration, velocity, or displacement.

In some embodiments of the apparatus, the processor may be configured to determine one or more damage rates from one or more sensors at the machine or the component.

In accordance with various aspects of the disclosure, a machine health monitoring system may include at least one vibration sensor configured to sense vibration of a machine or a component of the machine, a wireless receiver configured to receive vibration data from the at least one vibration sensor, and a processor configured to receive the vibration data from the wireless receiver. The vibration data may indicate vibration of the machine or the component of the machine, and the processor being configured to determine damage to the machine or the component for each of a plurality of load cycles based on the vibration data, determine the time rate of change of the damage to the machine or the component over the plurality of load cycles, and determine a damage rate based on the time rate of change of the damage to the machine or the component relative to a baseline damage rate.

According to some aspects of the system, the processor may be configured to determine the damage for each of the plurality of load cycles at a critical failure-prone location as proportional to a load on the machine or the component raised to a material-dependent exponent.

In some aspects of the system, the processor may be configured to determine the damage for each of the plurality of load cycles by relating a load on the machine or the component to one or more measurements from the vibration data using a transfer function. The transfer function may be frequency dependent. The load may be proportional to acceleration, velocity, or displacement.

According to various aspects of the system, the processor may be configured to determine one or more damage rates from one or more sensors at the machine or the component.

DETAILED DESCRIPTION OF EMBODIMENTS

Figure 1:
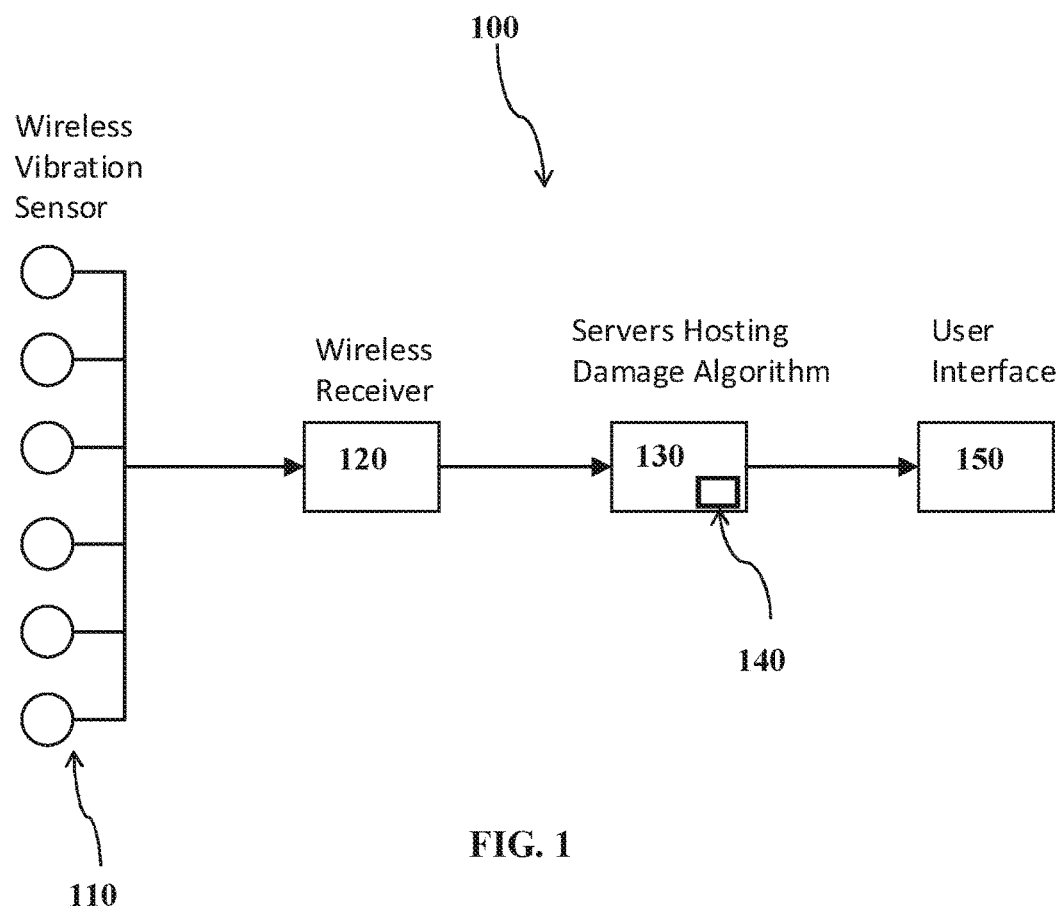
FIG. 1 is a schematic view of an exemplary machine health monitoring system in accordance with various aspects of the disclosure.

As shown in FIG. 1, a machine health monitoring system 100 for monitoring the health of a machine or component (not shown) includes vibration sensors 110, a receiver 120, a server 130, and a user interface 150. The server 130 includes a signal processer 140, which receives inputs from the vibration sensors 110, for example, wireless sensors, via the receiver 120, for example, a wireless receiver. Vibrations generated by the machine or component are sensed by the vibration sensors 110, which may be accelerometers. Processed vibration signals may be output to the user interface 150, for example, via a cellular, wireless, wi-fi, or internet connection, so that a user can assess whether or not a fault is likely to be present. Of course, the server 130 may include one or more servers, and the signal processor 140 may include one or more signal processors.

Wireless vibration monitoring offers cost-effective near real-time monitoring, which in part enables continuous monitoring in the BoP. In particular, it provides near real-time monitoring at a cost point that is 10-20 times less than that of a wired system and a few orders of magnitude more data than a route-based approach.

The infrastructure cost of this type of continuous monitoring is low, based on innovation in low power wireless communication, M2M infrastructure, cloud computing, and simple web based user interfaces.

To fully derive value from monitoring large numbers of equipment in near real time, the data needs to be efficiently reduced and presented to the maintainer in a form that is easily usable. For example, in a typical facility with 300 monitoring locations having sensors reporting 800 line vibration spectrum and time series on a 10 minute interval generates 69 million data points per day. Even if a diagnostic expert system with advanced vibration analysis algorithms is used, a host of indicators are required for each monitoring location. Monitoring the health results from 300 monitoring points with multiple indicators on a frequent schedule is time intensive and impractical in most cases. For example, monitoring of 1500 indicators (5 per monitoring point) may be required as machines move through temporary conditions, like during start up, is a common scenario. This would generate hundreds of alarm email notifications, which would overwhelm users.

Customization of the analysis and health indicators can be done to help automate the diagnostics, using certain expert diagnostics solutions. However, this configuration exercise often results in a brittle diagnostic system which only works in certain cases. It also is time consuming to implement in most cases, which erodes the cost-value case for this technology.

In these cases, a generalized indicator, such as the Damage Accumulation indicator according to the disclosure, is helpful for early warning indication of the health of the equipment. This reduces the number of early warning indicators that are required and simplifies monitoring. The early warning is then used to trigger in-depth analysis if a problem is identified. Peak and RMS indicators are often used for this purpose. In fact, these two time series indicators are used far more than any other machine health indicator in BoP monitoring due to the aforementioned practical CBM implementation challenges. However, Peak and RMS indicators lack capability to account for impulse behavior, frequency of load reversals cycles, and nonlinearity of the increase in damage relative to an increase in vibration amplitude.

Prior work to address the aforementioned limitations of Peak and RMS indicators has included the PeakVue indicator described in U.S. Pat. No. 5,895,857 by Robinson et al. A similar indicator is described in U.S. Pat. No. 7,493,220 by Leigh et al. PeakVue enables impulse behavior due to rolling element flaws or gear tooth cracks to be viewable with a single indicator value. However, PeakVue does not account for the accumulation of damage over time. Rather it reflects a symptom of the machine health. In contrast, Damage Accumulation reports on the accumulating damage that leads to the onset of machine health symptoms.

The new Damage Accumulation indicator is a stand-alone composite indication of the "real" damage that a machine is encountering at a given point in time. Damage Accumulation uniquely accounts for vibration changes that a number of other indicators identify, include Peak and RMS, while also accounting for impulse behavior, frequency of load reversal cycles, and nonlinearity in the damage-to-amplitude relationship. Damage Accumulation is not only useful as a generalized diagnostic indicator; it also addresses the need for real time operational monitoring. For example, Damage Accumulation can indicate changes in machine load which are often overlooked in detailed analysis such as alignment or bearing analysis.

Operational monitoring is important because load and speeds can be adjusted in many cases if their effect on the machine life is estimated and understood. This is a key value in real-time, persistent monitoring versus route-based monitoring because the critical data in this type of analysis occurs during unexpected conditions that are not known a priori and, therefore, not selected for analysis using route monitoring.

Operational monitoring is differentiated from machine diagnostics because precursors relating to the operating conditions that lead to the initiation of faults are monitored rather than the faults themselves. Such precursors are generally unexpected loading conditions that lead to damage.

Damage Accumulation leverages the idea that machines fail as a result of repetitively applied loading that slowly leads to fault growth. In other words, most machines fail at a fundamental level due to fatigue or weakening of a component's material caused by repeatedly applied loads. For example, most bearing damage initiates in this way, unbalance and misalignment progresses due to intermittent excessive loading, weld joints and bolts fatigue and crack, and many other forms of wear are initiated by cyclic overloading. The nominal maximum stress that causes such damage may be much less than the ultimate or even yield strength of the material. In these cases, microscopic cracks form at the stress concentrations near the surface at persistent slip bands (PSBs) and grain interfaces.

Eventually a crack will reach a critical size, and propagate until fracture. This general fatigue damage growth behavior links most machine faults and adverse operating conditions, thereby providing an opportunity to create a generalized indicator, Damage Accumulation, and use it universally, in a similar way to how Peak and RMS are used.

Damage Accumulation builds on this fundamental cyclic loading failure concept and extends it generally to mechanical systems. Although not all mechanical systems fail due to traditional fatigue, the vast majority of faults grow in a way that matches this underlying material degradation mechanism. This approach accepts the approximate nature of vibration-based, fatigue monitoring because often the objective of this monitoring approach is to address the adverse conditions that lead to failure rather than estimate the precise failure time.

Figure 2:
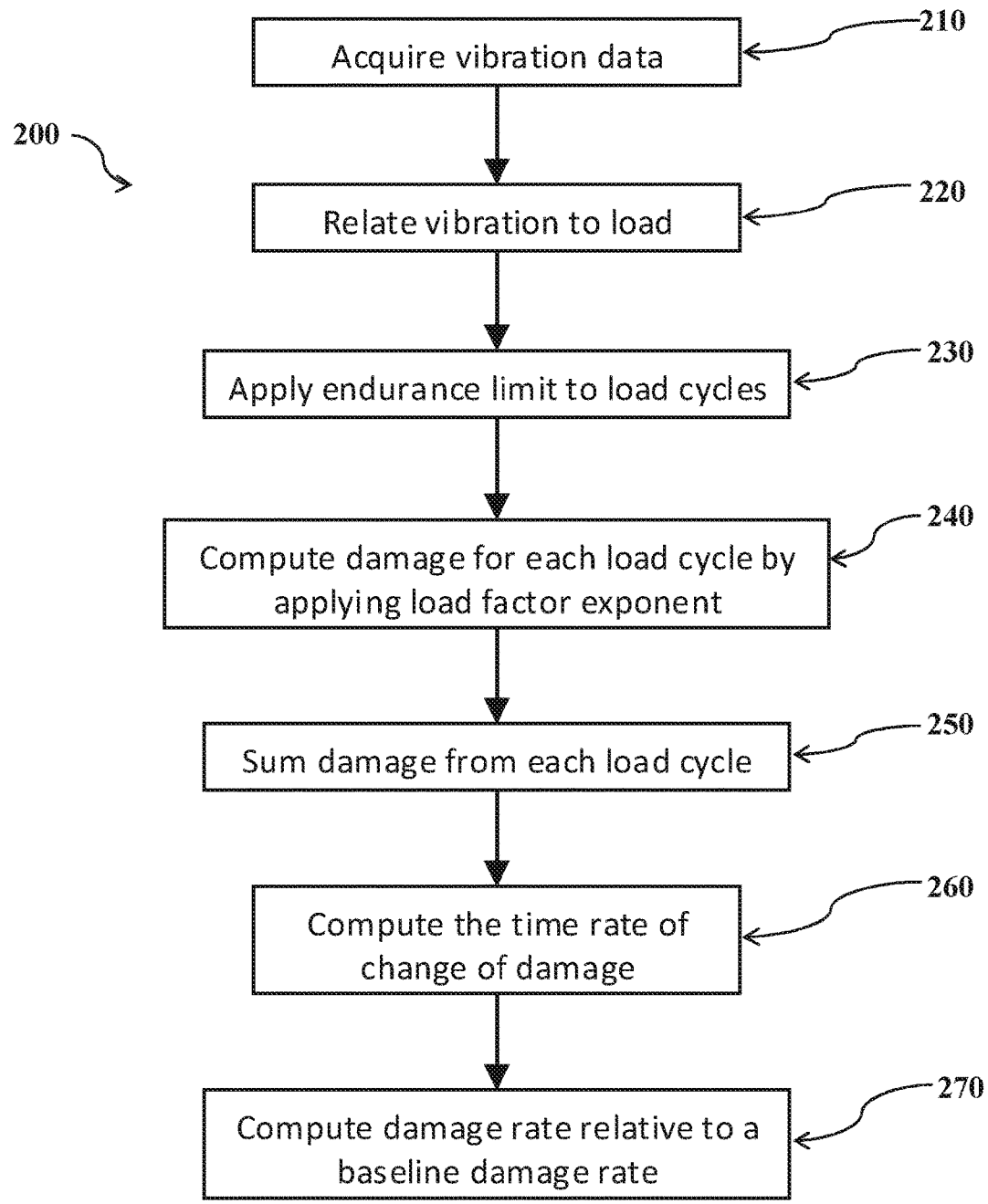
FIG. 2 is a flow chart illustrating an exemplary machine health monitoring method in accordance with various aspects of the disclosure.

Referring to FIG. 2, an exemplary machine health monitoring method 200, for example, Damage Accumulation, is illustrated. The method 200 may be implemented on the exemplary machine health monitoring system 100, including the vibration sensors 110, the receiver 120, the server 130, and/or the user interface 150. The method 200 may include acquiring vibration data (step 210) from, for example, the vibration sensors 110, which are mounted to a machine or a component of a machine (not shown).

In step 220, the processor 140 may relate the vibration data, including vibration measurements, to a load on the machine or the component of the machine. The generalization and broadness of the applicability of damage growth monitoring is clear when considering a general form where L, the life given by the number of repeated stress cycles before failure is inversely related to the applied stress or load, $\tau$, raised to a power, n, which is a component or material property:

$$L \sim \frac{1}{\tau^n} \quad (1)$$

Figure 3:
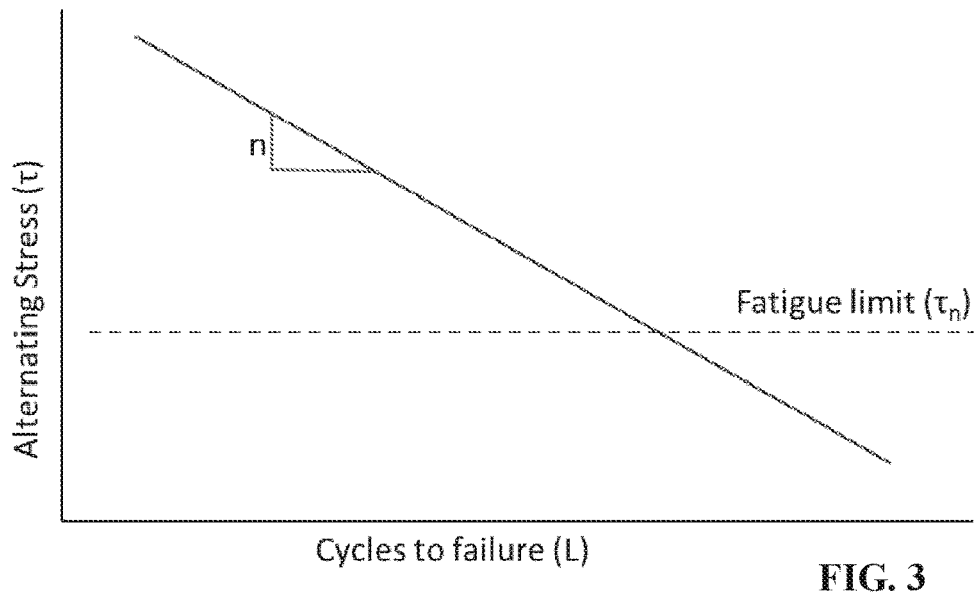
FIG. 3 is a graph illustrating a generalized fatigue life degradation trend.

This relation, when shown on log-log scale is a straight line, as illustrated in FIG. 3. For most materials, decreasing stress levels have a diminishing impact on life, which is accounted for in some cases by a fatigue stress limit ($\tau_l$), where the component life is given by:

$$L \sim \frac{1}{(\tau - \tau_l)^n} \quad (2)$$

The damage is not proportional to the stress amplitude, rather it is proportional to amplitude raised to a power that typically depends on material properties. The exponent is important because small increases in loading can result in large increases in damage. For example, a few short impulses with a 10 g amplitude, which is often filtered out and ignored in frequency analysis, can be responsible for more damage than a 1 g continuous vibration that occurs over a few hours of operation.

The application of fatigue life relationships to machine component life is common and is exemplified by ISO Standard 281 for rolling bearings, which uses this same basic relationship. This standard specifies that bearing life is given by the following relationship:

$$L_{10} = \left(\frac{C_D}{P_{eq}}\right)^p \quad (3)$$

Figure 4:
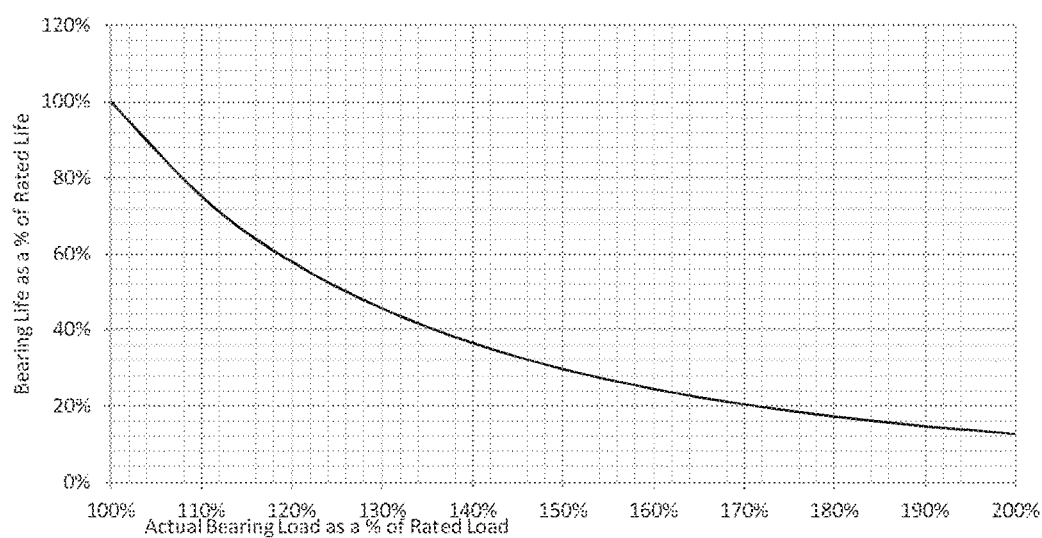
FIG. 4 is a graph illustrating expected bearing life versus bearing load.
Figures 5A, 5B, 5C:
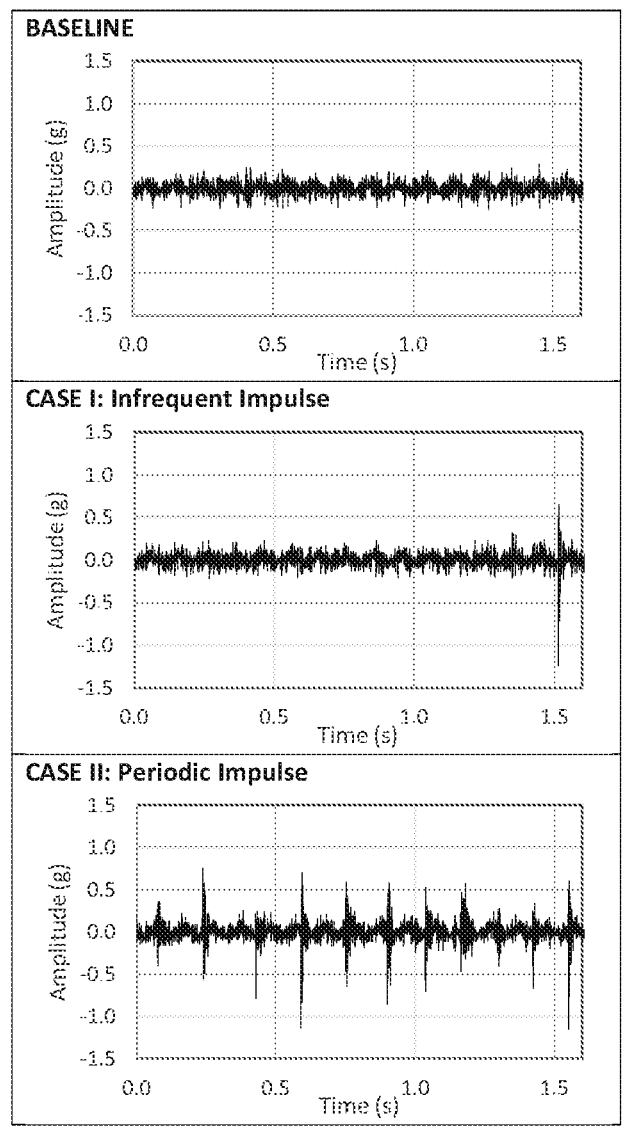
FIGS. 5A-5C are graphs illustrating machine condition baseline and shock impulse fault cases.

In Eq. 3, $L_{10}$ is the point at which a bearing has a 90% probability of survival or a 10% probability of failure, $C_D$ is the dynamic load capacity or the theoretical load on the bearing that will result in an $L_{10}$ life of one million inner-race revolutions, $P_{eq}$ is the radial load on the bearing, and p is the load-life exponent. Expected bearing life versus bearing load is shown in FIG. 4.

Some vacuum-processed steels, such as AISI 52100, exhibit load-life exponents of 4 for ball bearings and 5 for roller bearings, instead of the typical value of 3 given in the ISO standard. Notice the similarities between Eq. 1 and 3, where the ratio of $C_D$ to $P_{eq}$ is a relative bearing load value (analogues to $1/\tau$) and p is related to the bearing properties (analogues to n in Eq. 1). The underlying similarity to fatigue damage growth exists because bearing surface fatigue damage eventually leads to small cracks that in turn lead to pitting, excessive bearing wear, and eventual failure.

The Damage Accumulation formulation is derived from the same power relationship but uses the following high-cycle (materials behaving elastically) metal fatigue form, commonly known as the Basquin equation:

$$N^i = \left(\frac{s_a^i}{S_f}\right)^{\frac{1}{b}} \quad (4)$$

In this relationship, $N^i$ is the number of stress reversal cycles to failure for a given loading i, $s_a^i$ is the alternating stress, b is the fatigue strength exponent, and $s_f$ is the fatigue strength coefficient and is approximately equal to the true fracture stress. This is simplified by generalizing the relative load parameter to $A=s_f^m$ and define a load factor $m=-1/b$ in the following equation:

$$N^i = A(s_a^i)^{-m} \quad (5)$$

Similar to the simple form in Eq. 1, the exponent m is application dependent, greater than zero, and typically ranges between 1 and 6 for mechanical structures and systems.

TABLE 1

| Typical load exponent values (m). | |
| --- | --- |
| M | Application |
| 3 | standard value for crack-growth-dominated process, applicable to sharply notched or welded structures |
| 5 | valid for many engineering components |
| 6 | glass fiber |

Considering Eq. 5, fatigue damage monitoring requires strain or stress measurements at the critical points where failure is expected to occur or at key locations that can be used to characterize the stress state of the component. Measuring strain sensors is impractical in an industrial setting because of the high cost of installing and sustaining wired strain sensors. In certain cases, such as helicopter rotor monitoring, strain sensors have been placed at critical locations that can be used to determine the stress or load state of the component.

Using tools such as wireless sensors, vibration can be much more easily and cost effectively monitored than strain or stress. Relating vibration measurements to localized stress at the essential target failure location requires a transfer function. To this end, the following linear relationship between acceleration and stress can be used in many cases:

$$s_a^i \propto a^i \qquad (6)$$

where $a^i$ is the vibration amplitude for a given cycle.

For example, dynamic loading from shaft unbalance or misalignment can cause a machine to vibrate. The acceleration measured on the exterior of the machine is loosely linked to localized stress through Newton's second law. This is valid if the machine components are massive, are elastically linear, and have low material damping. In most cases, the critical stress at the critical fault location is proportional to the inertial forces that in turn can be estimated based on acceleration measurements. For this to be valid, the vibration measurement needs to be directly in or near the transmission path of the dynamic loading that is causing the stress variations. This generalization for relating stress to vibration is necessary to simplify the application of Damage Accumulation.

If the accelerometer cannot be located near the dynamic loading transmission paths, then a more comprehensive modeling approach may be required. This is because the local vibration modes of the structure may create a frequency dependence in the relationship between acceleration and stress. In addition, if multiple load transmission paths to the critical stress location exist, then multiple vibration monitoring points may be required. The relationship between stress and acceleration at multiple points ($a_1$, $a_2$ . . . ) can then take on the following linear form:

$$s_a = \Sigma_k a_k H_k(f) \qquad (7)$$

where the transfer function $H_k(f)$ is a frequency dependent parameter.

Other models that account for nonlinear weighting of the contribution of the vibration measurements can also be used in certain cases. In the case where one acceleration input is used, the transfer function could be measured practically using a strain measurement and the accelerometer. Often, this is a challenge because the critical stress is in a difficult to reach location. If multiple acceleration measurements are used as inputs, determining the transfer functions is a more involved process. In complex structures with multiple failure modes and multiple critical failure locations, a damage factor for each one may be required.

In addition, depending on the structure between the sensor (acceleration measurement location) and the critical stress location, displacement or velocity may relate more closely to stress rather than acceleration. This can be determined by considering the basic architecture of the structure. Three scenarios for relating stress to acceleration, velocity, and displacement are shown below:

$$s \sim F \sim m\ddot{x} \sim a$$

$$\sim c\dot{x} \sim v$$

$$\sim kx \sim d \qquad (8)$$

In most cases, the structure that the sensor is mounted to is massive relative to the mount stiffness and internal damping or mounting damping forces of the structure, and, therefore, acceleration is used to estimate Damage Accumulation (previously shown in Eq. 6). In certain other cases where damping forces are significant, such as in journal bearing and some soft foot cases, velocity is a better basis for calculating Damage Accumulation. In rare cases, the structural loading is driven by stiffness, and displacement is used in the Damage Accumulation calculation. This is generally only useful for low speed excitation and light-weight or truss structures.

The significance of high frequency content is an additional factor that can be used to help decide whether to use acceleration, velocity, or displacement. Acceleration emphasizes the contribution of high frequency vibration, while, conversely, displacement emphasizes the contribution of low frequency vibration.

Looking at the case where the stress is proportional to acceleration as shown in Eq. 6, Eq. 6 can be substituted into Eq. 5. Lumping the machine specific characteristics in the constant C, which is equivalent to A in Eq. 5, gives the following generalized estimate for component life:

$$N^i \cong C(a^i)^{-m} \qquad (9)$$

In step 230, the processor 140 may apply an endurance limit to load cycles. In Eq. 9, consideration of the fatigue life limit or endurance limit is not included. One way to account for the fatigue life limit is to subtract a threshold acceleration amplitude, $a_t$, from each cycle. This method also mitigates the erroneous influence of noise because cycles below the endurance threshold $a_t$ do not contribute to the damage estimate estimation:

$$N^i \cong C(a^i - a_t)^{-m} \qquad (10)$$

Selecting the endurance threshold $a_t$ requires engineering judgment unless the stress-acceleration transfer function is measured and valid for the specific application. Considering the effort required to determine $a_t$, and that it is not accounted for in bearing life calculations, $a_t$ should be chosen to be small, but larger than the noise floor of the sensor.

This analysis does not consider the mean stress on a component because the measured DC acceleration signal is not necessarily referenced to a neutral stress state. Compensating for mean stress would shift the fatigue life curve in FIG. 3 vertically. The shift direction depends on the sense of the stress. In this analysis, mean stress is not accounted for.

In step 240, the processor 140 may determine damage for each load cycle by applying a load factor exponent. Borrowing again from fatigue analysis methods, Miner's rule can be applied in conjunction with Eq. 10. Miner's rule states that part life is decremented by a linear combination of cycles for each given load. This approach allows load cycles of different amplitudes to be treated independently and summed to provide a composite damage estimate as follows:

$$D = \Sigma_i D^i \qquad (11)$$

$$\text{where } D^i = \frac{n^i}{N^i}$$

And substituting Eq. 10 into Eq. 11 gives:

$$D \cong \frac{1}{C} \Sigma_i n^i (a^i - a_t)^m \qquad (12)$$

where $n^i$ is the number of cycles at a given load condition. Component failure occurs when D approaches a value of 1.

In summary, vibration measurements taken on the outer surfaces of a machine can be used to determine the damage at one or more critical locations in a machine. The damage for a given vibration cycle is proportional to the machine vibration characteristics raised to a material dependent exponent. The vibration characteristics that are used in the calculation can involve frequency dependence and/or filters. As shown in Eq. 7, certain vibration frequencies can be emphasized and allowed to contribute more strongly to the damage. For example, high frequency vibration at the sensor location that does not propagate well to the critical components can be ignored by applying a frequency dependent transfer function H(f). In this case the transfer function could be a filter with a 20 dB per decade fall off in amplitude at a given cut-off frequency of 500 Hz. Other transfer functions can include a high pass or bandpass filter. As described in Eq. 8, specific variants of the transfer function concept are embodied in the definition of velocity and displacement, which are time integrations of the acceleration waveform. Considering the harmonic nature of machine vibration, velocity is equivalent to the acceleration divided by frequency. Similarly, displacement is given by the acceleration divided by the square of frequency. In these cases, the acceleration shown in Eq. 12 could be replaced with displacement, velocity, or another transfer function which uses acceleration.

The transfer function can include multiple acceleration measurement inputs. Multiple acceleration inputs from different locations are important in cases where damage is related to load from two different sources like, for example, cavitation and unbalance on a pump. One sensor may be responsible for measuring cavitation and another is best positioned for measuring unbalance. Since both contribute to the damage at, for example, a critical bearing, the contributions of both can be included in a single figure based on a summation of contributions from both sensors. In such cases, the transfer function would include multiple acceleration inputs and may use multiple different bandpass filters.

In addition, a single machine may have multiple damage metrics, one for each critical location or failure mode. The damage for a bearing will be the damage due to erosion of the impeller in a pump. The damage indicators for each component can use one or more of the same sensors but may use different transfer functions.

Because this method presumes no absolute knowledge of the machine mechanics to determine the parameter C, and the prior loading and maintenance history is not known, the damage accumulation rate relative to a known, baseline damage rate D is used for computing R, the Damage Accumulation, as follows:

$$R \cong \frac{d}{dt}\left(\frac{D}{D'}\right) \quad (13)$$

The wireless vibration monitoring system captures a time series block of vibration data every few minutes. This intermittent nature of the acquisitions offers the opportunity to assess damage rate each time a new block of data is received.

In step 250, the processor 140 may sum the damage from each load cycle, in step 260, the processor 140 may determine the time rate of change of damage, and in step 270, the processor 140 may determine the damage rate relative to a baseline damage rate to arrive at the Damage Accumulation. The damage and baseline rates are calculated as a sum of the loading cycles raised to the m power divided by the sample duration $\Delta t$.

The Damage Accumulation metric is then given by $$R \cong \frac{1}{\Delta t}\Sigma_i n^i(a^i - a_t)^m / B \quad (14)$$

where the baseline is calculated as $$B = \frac{1}{\Delta t_B}\sum_i n^i(a^i - a_t)^m$$

The baseline B may be averaged over multiple blocks of data to increase accuracy. Similarly, the rate R can be averaged over a moving period that is specified to be less than the load or speed variation of the machine. This is an adjustment that can be set for each particular application. A Rainflow counting algorithm such as that specified in ASTM Standard E1049-85 can be used for digesting a signal into cycles at each load amplitude.

One important distinction between Damage Accumulation and other time series analysis indicators (i.e., Peak and RMS) is its relative nature, which therefore necessitates use of a baseline. A baseline is important in most cases anyway because most installations vary considerably from their normal operations with prescribed acceptable vibration levels, making standards such as ISO Standard 10816 impractical to use.

The seemingly arbitrary selection of the endurance threshold, the transfer function between vibration and critical stress, and the baseline is a reality in the practical application of Damage Accumulation. This is acceptable because vibration diagnostics is probabilistic, and approximate since vibration characteristics are symptoms that are not part of an exclusive causal relationship with most faults. In general, the approximate nature of the Damage Accumulation analysis is in line with the overarching diagnostics limitations of vibration monitoring.

EXAMPLE 1

The usefulness of Damage Accumulation as a key indicator of machine faults or operational problems is clarified in the following test bed example and in a high pressure pump field application. The test bed comprises a motor, gearbox, shaft, and pulley driveline. It includes a controllable shaft unbalanced, a flexible shaft coupling with adjustable parallel shaft misalignment, and an adjustable soft foot.

Vibration data was acquired using a wireless sensor located on a pillow block. The sensor acquired an 800 line spectrum and used a sampling frequency of 1024 Hz. An m (recall the load parameter in Eq. 5) of 3 was used in all demonstrations.

Damage Accumulation's application for identifying and quantifying the severity of knocking or impulse behavior is considered first. This type of behavior is often observed in reciprocating equipment or machines with loose components. Traditional frequency domain and time series methods do not accurately characterize the damage created by impulse shock loading or severity of vibration of this type. Impulse vibration cases are considered in this analysis to emphasize the broad applicability of Damage Accumulation compared to traditional vibration monitoring using Peak, RMS, or frequency spectrum analysis. As shown in FIGS.

5A-5C, two cases were considered: one with an infrequent impulse (Case 1) and one with a frequent periodic impulse (Case II).

The change in the RMS, Peak, 1X, and the Damage Accumulation amplitude relative to the baseline is shown in Table 2. The 1X value is found by performing a Fast Fourier Transform (FFT) of the time series using a Flat Top window, and evaluating the amplitude in a narrow frequency band corresponding to the fundamental (1X) running speed of the machine. Damage Accumulation is calculated using Eq. 14.

TABLE 2

Comparison of Damage Accumulation to Peak, RMS, and 1X for fault Case I, II.

| Increase Relative to Baseline | Case I | Case II |
|---|---|---|
| Damage Accumulation | 186% | 884% |
| RMS | 15% | 68% |
| Peak | 354% | 318% |
| 1X | 1% | 19% |

In these example cases, the value in Damage Accumulation as a generalized indicator is demonstrated relative to traditional metrics including RMS, Peak, and 1X, based on the following observations:

1) Damage Accumulation increases as a result of short duration impulses, thereby characterizing the damaging impulse loading.
2) The higher Damage Accumulation for Case II than Case I accurately captures the higher level of damage caused by frequent impulses. Note that the Peak measurement does not capture this difference.
3) The small 15% change in the RMS value for Case I indicates that it is a poor metric for identifying and monitoring impulse behavior.
4) Frequency spectrum analysis (1X amplitude in this case) is only useful when the impulses occur frequently or on a consistent basis where envelope analysis can be used.

Figures 6A, 6B, 6C:
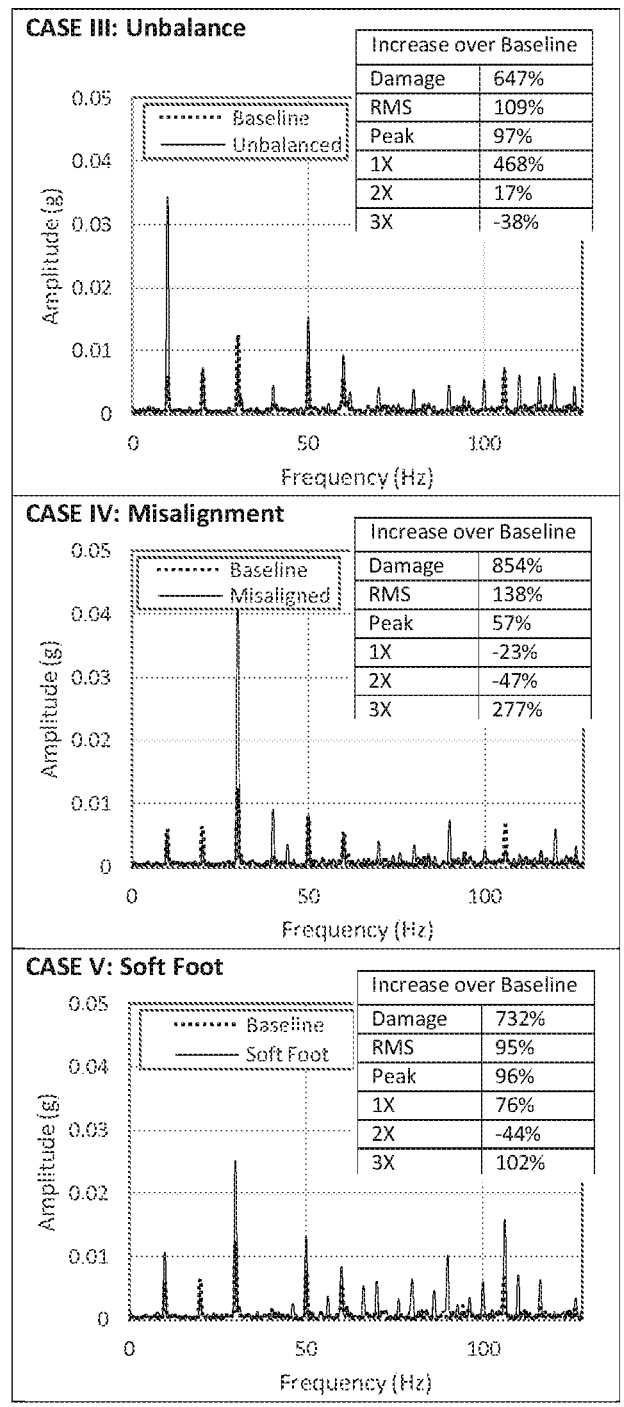
FIGS. 6A-6C are graphs illustrating induced fault results for unbalance, misalignment, and soft-foot cases.

Damage Accumulation is also valuable for monitoring common machine faults such as unbalance, misalignment, and soft foot. Frequency spectrum and key indicators are shown in FIGS. 6A-6C for these three faults. In this analysis, the sampling frequency was set to 256 Hz with 800 lines of spectral resolution.

Any number of indicators can be used to identify the presence of these vibration faults including Peak, RMS, and vibration spectral bands (1X, 2X, and 3X). The 3X band, rather than the more typical 2X band, shows elevated levels for the misalignment case due to the particular design of the 3-finger flexible shaft coupler. The frequency band analysis is performed as previously mentioned for fault Cases I and II. However, the results in FIGS. 5A-5C and 6A-6C emphasize that Damage Accumulation identifies the presence of impulsive behavior as well as common faults, which enables broad applicability of Damage Accumulation for a diverse range of machines and machine failure modes. This is not surprising considering the general nature of Damage Accumulation's fatigue life foundation.

Example 2

The efficacy of Damage Accumulation was further evaluated for identifying and quantifying the severity of adverse operating conditions in high pressure pumping applications. In particular, it was applied to hydraulic fracturing in oil and natural gas well completion where pump components rapidly wear and contribute to high downtime costs and safety incidents. Pump fluid ends exhibit valve wear, plunger seal (packing) failure, and in certain cases, fluid manifold cracking. In addition, fluid-induced mechanical resonance in the high pressure piping can cause large transients where the pipes vibrate violently. This leads to excessively high bending loads in unions and mounts, accelerated fatigue, and ultimately high-pressure leaks or catastrophic mechanical failure.

Hydraulic fracturing pump and, in particular, fluid end wear are caused by complex combinations of low suction pressure, excessive outlet pressure, excessively high or low pumping speeds, valve wear, packing failure, debris, damper malfunction, and interdependent adjacent pump interaction. One of the main underlying effects of these problems is intermittent cavitation and resulting high pressure impulses in the fluid, causing high wear and fatigue rates. Such impulses dramatically shorten pump fluid end life from an expected life of 1000 hours to as little as 350 hours.

In this particular application, the pump speeds and pressures are only controlled within predefined ranges for the purpose of achieving the intended hydraulic fracturing outcome in the well. Machine and component wear is rarely considered and or even evaluated as an input to help define how to operate the pumps. Damage Accumulation is useful in this application because it enables a useful estimation of the severity of impulse pumping behavior. This information is used in real time to fine tune the pump speeds and pressures, diagnose problematic components (damper malfunction, blocked suction lines, etc.), and avoid high severity conditions.

Figure 7A:
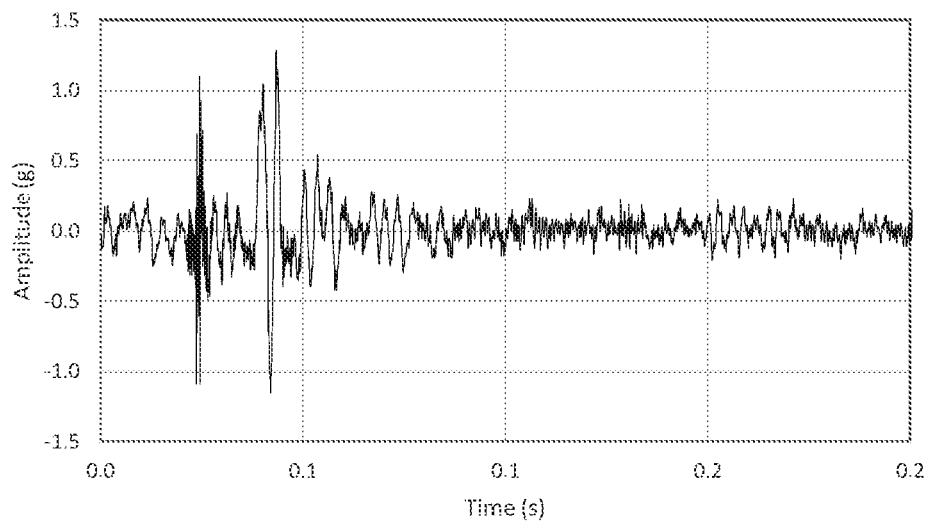
FIGS. 7A and 7B are graphs illustrating reciprocating hydraulic fracturing pump vibration impulse and baseline time series.
Figure 7B:
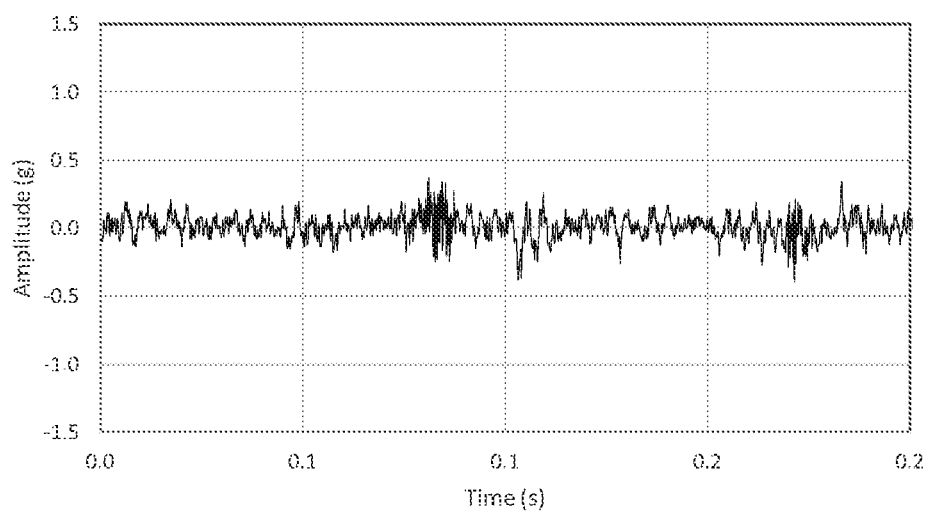

Hundreds of wireless accelerometers have been used to monitor hydraulic fracturing pumping operations. FIGS. 7A and 7B show a typical impulse as measured using a wireless accelerometer mounted on the outside of the pump fluid end. The Baseline or normal pump acceleration time series is shown in the lower plot (FIG. 7B). The upper, problematic time series (FIG. 7A) has a Damage Accumulation of 16.2 (1620%), which is relative to the baseline of 1.0 for the lower plot. This high level indictor value for this particular data set accurately shows the true severity and expected damage that these pumps are incurring. An m value of 3 was used in this evaluation. This particular impulse occurred at the start of a fracturing stage where the pumps were being brought up to their full operational speed. This impulse behavior can be minimized or avoided by tailoring certain pump conditions at startup. Without this type of monitoring, the wear caused by this type of impulse goes unnoticed.

Large savings may be realized by using Damage Accumulation monitoring in these applications because fluid ends cost on an order of $70,000 and downtime typically costs $20,000/hr. Over a 6 month period, wireless vibration monitoring and Damage Accumulation were shown to reduce Non-Productive Time (NPT) by 2 hours per day, saving $40,000 per day in certain applications.

Wireless continuous monitoring and its complementary Damage Accumulation analysis technique were shown to address challenges in applying continuous health monitoring to the Balance of Plant. Damage Accumulation efficiently reduces large volumes of machine health data and offers a single parameter indication of machine health status to the maintainer, which is essential to realize the high value associated with Balance of Plant health monitoring. This Damage Accumulation monitoring approach trades precision and the ability to classify faults for universal applicability and ease of use, which is an essential technique to practically monitoring the Balance of Plant. Damage Accumulation avoids, for example, the brittleness of expert diagnostic systems, and the setup and user complexity overhead associated with customized machine analysis implementation. In these cases, Damage Accumulation is used to trigger a detailed inspection, fault classification, and diagnosis.

Damage Accumulation is broadly applicable because its foundation is rooted in the fundamental and universal idea that most machines fail as a result of repetitive applied loading that slowly leads to fault growth. In other words, most machines fail, at a fundamental level, due to fatigue or weakening of a component's material caused by repeatedly applied loads. Relative to traditional vibration analysis, Damage Accumulation uniquely accounts for the contribution of repeated load reversal cycles to component damage and the nonlinearity in the relationship between damage and vibration amplitude.

As described above, Damage Accumulation has been shown to indicate the presence of unbalance, misalignment, and soft foot faults on a test stand. This indicator was further evaluated on a high pressure hydraulic pump. In these cases, it more comprehensively captured the machine faults than traditional time series and frequency spectrum analysis techniques, thereby showing that Damage Accumulation simplifies the application of continuous monitoring. In these cases, it also was shown to recognize commonly overlooked time varying symptoms in machines which are not properly handled by traditional vibration diagnostic frequency analysis or time series analysis. It is also worth noting that Damage Accumulation is a time domain calculation that can be performed using low power microprocessors.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments. For example, various features of the different embodiments may be used together where appropriate.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A machine health monitoring method, comprising:
receiving vibration data from a sensor coupled with a machine or a component of the machine, the machine being a fan, a pump, or a motor, the vibration data indicating vibration of the machine or the component of the machine;
determining a baseline damage rate for the machine or the component based on the vibration data;
determining damage to the machine or the component for each of a plurality of load cycles based on the vibration data;
determining the time rate of change of the damage to the machine or the component over the plurality of load cycles;
determining a damage rate based on the time rate of change of the damage to the machine or the component relative to the baseline damage rate; and
outputting, based on the determined damage rate, an indication of health of the machine or the component.

2. The method of claim 1, wherein the step of determining the damage for each of the plurality of load cycles comprises determining the damage for each of the plurality of load cycles at a critical failure-prone location as proportional to a load on the machine or the component raised to a material-dependent exponent.

3. The method of claim 1, wherein the step of determining the damage for each of the plurality of load cycles comprises relating a load on the machine or the component to one or more measurements from the vibration data using a transfer function.

4. The method of claim 3, wherein the transfer function is frequency dependent.

5. The method of claim 3, wherein the load is proportional to acceleration.

6. The method of claim 3, wherein the load is proportional to velocity.

7. The method of claim 3, wherein the load is proportional to displacement.

8. The method of claim 3, further comprising:
acquiring the one or more vibration measurements using wireless vibration accelerometers.

9. The method of claim 1, wherein the step of determining the damage rate comprises determining one or more damage rates from one or more sensors at the machine or the component.

10. A machine health monitoring apparatus, comprising:
a processor configured to receive vibration data from a sensor coupled with a machine or a component of the machine, the machine being a fan, a pump, or a motor, the vibration data indicating vibration of the machine or the component of the machine, the processor being configured to:
determine a baseline damage rate for the machine or the component based on the vibration data;
determine damage to the machine or the component for each of a plurality of load cycles based on the vibration data;
determine the time rate of change of the damage to the machine or the component over the plurality of load cycles;
determine a damage rate based on the time rate of change of the damage to the machine or the component relative to a baseline damage rate; and
outputting, based on the determined damage rate, an indication of health of the machine or the component.

11. The apparatus of claim 10, wherein the processor is configured to determine the damage for each of the plurality of load cycles at a critical failure-prone location as proportional to a load on the machine or the component raised to a material-dependent exponent.

12. The apparatus of claim 10, wherein the processor is configured to determine the damage for each of the plurality of load cycles by relating a load on the machine or the component to one or more measurements from the vibration data using a transfer function.

13. The apparatus of claim 12, wherein the transfer function is frequency dependent.

14. The apparatus of claim 12, wherein the load is proportional to one of acceleration, velocity, or displacement.

15. The apparatus of claim 10, wherein the processor is configured to determine one or more damage rates from one or more sensors at the machine or the component.

16. A machine health monitoring system, comprising:
at least one vibration sensor coupled with a machine or a component of the machine, the machine being a fan, a pump, or a motor, the at least one vibration sensor being configured to sense vibration of the machine or the component of the machine;
a wireless receiver configured to receive vibration data from the at least one vibration sensor, the vibration data indicating vibration of the machine or the component of the machine; and
a processor configured to receive the vibration data from the wireless receiver, the processor being configured to:
determine a baseline damage rate for the machine or the component based on the vibration data;
determine damage to the machine or the component for each of a plurality of load cycles based on the vibration data;
determine the time rate of change of the damage to the machine or the component over the plurality of load cycles; and
determine a damage rate based on the time rate of change of the damage to the machine or the component relative to the baseline damage rate; and
outputting, based on the determined damage rate, an indication of health of the machine or the component.

17. The system of claim 16, wherein the processor is configured to determine the damage for each of the plurality of load cycles at a critical failure-prone location as proportional to a load on the machine or the component raised to a material-dependent exponent.

18. The system of claim 16, wherein the processor is configured to determine the damage for each of the plurality of load cycles by relating a load on the machine or the component to one or more measurements from the vibration data using a transfer function.

19. The system of claim 18, wherein the transfer function is frequency dependent.

20. The system of claim 18, wherein the load is proportional to one of acceleration, velocity, or displacement.

21. The system of claim 16, wherein the processor is configured to determine one or more damage rates from one or more sensors at the machine or the component.

* * * * *